United States Patent
Kraemer et al.

(10) Patent No.: US 7,963,699 B2
(45) Date of Patent: Jun. 21, 2011

(54) THERMAL SPRAYED BEARING SHELLS FOR CONNECTING ROD

(75) Inventors: Johann Kraemer, Leonberg (DE); Christian Russer, Ulm (DE)

(73) Assignee: Daimler AG, Stuttgart (DE)

( * ) Notice: Subject to any disclaimer, the term of this patent is extended or adjusted under 35 U.S.C. 154(b) by 1385 days.

(21) Appl. No.: 11/281,134

(22) Filed: Nov. 17, 2005

(65) Prior Publication Data

US 2006/0182375 A1    Aug. 17, 2006

(30) Foreign Application Priority Data

Nov. 17, 2004    (DE) .......................... 10 2004 055 228

(51) Int. Cl.
*F16C 9/04*    (2006.01)
*F16C 33/02*    (2006.01)
*C23C 4/00*    (2006.01)
*B21D 53/88*    (2006.01)

(52) U.S. Cl. ..................... 384/294; 384/276; 29/888.09; 427/446; 427/455

(58) Field of Classification Search .................. 384/268, 384/276, 288–289, 294–295, 445, 430, 469; 29/898.059, 898.09; 428/546, 650, 653; 148/531, 534; 427/446, 455–456
See application file for complete search history.

(56) References Cited

U.S. PATENT DOCUMENTS

| | | | | |
|---|---|---|---|---|
| 3,562,884 A | * | 2/1971 | Webbere ................... | 29/898.059 |
| 4,590,133 A | * | 5/1986 | Lloyd .......................... | 428/653 |
| 4,930,910 A | * | 6/1990 | Mori et al. .................... | 384/276 |
| 5,209,578 A |   | 5/1993 | Eastham et al. | |
| 5,445,896 A | * | 8/1995 | Tanaka et al. ................. | 384/912 |
| 5,551,782 A | * | 9/1996 | Arnhold et al. ............... | 384/294 |
| 5,620,652 A | * | 4/1997 | Tack et al. ..................... | 420/532 |

(Continued)

FOREIGN PATENT DOCUMENTS

DE    19731625 A1    9/1998

(Continued)

OTHER PUBLICATIONS

Office action issued in corresponding German application procedure, Sep. 23, 2009.

*Primary Examiner* — Marcus Charles
(74) *Attorney, Agent, or Firm* — Patent Central LLC; Stephan A. Pendorf

(57) ABSTRACT

Bearing shell of a connecting rod which is located in the larger connecting rod eye in which the bearing shell is constituted by several thermally sprayed layers and the topmost material layer of the bearing shell is essentially constituted by an aluminum/bismuth alloy as well as a bearing shell of a connecting rod which is at least located in the larger connecting rod eye in which the entire bearing shell is essentially constituted by a thermally sprayed layer of aluminum/bismuth alloy and process for the fabrication of a bearing shell on a connecting rod eye with the steps mechanical roughening of the connecting rod surface in the region of the bearing, thermal coating onto the surface with a bearing metal or a bearing material to build up a bearing layer and thermal coating onto the bearing layer with an Al/Bi alloy to build up a sliding layer, as well as a process for the fabrication of a bearing shell on a connecting rod eye with the steps mechanical roughening of the connecting rod surface in the region of the bearing and thermal coating onto the surface with an Al/Bi alloy to build up a bearing and sliding layer.

15 Claims, 1 Drawing Sheet

U.S. PATENT DOCUMENTS

| | | | |
|---|---|---|---|
| 6,114,791 A * | 9/2000 | Ito et al. | 310/233 |
| 6,139,191 A * | 10/2000 | Andler et al. | 384/276 |
| 6,273,970 B1 * | 8/2001 | Kopeliovich et al. | 148/437 |
| 6,379,754 B1 * | 4/2002 | Schlegel et al. | 29/888.09 |
| 6,506,503 B1 * | 1/2003 | Mergen et al. | 384/445 |
| 6,513,238 B1 * | 2/2003 | Schlegel | 384/430 |
| 6,560,869 B1 | 5/2003 | Schlegel et al. | |
| 2003/0168333 A1 * | 9/2003 | Schlott et al. | 204/192.13 |
| 2004/0048094 A1 * | 3/2004 | Rubel et al. | 428/650 |
| 2004/0180796 A1 * | 9/2004 | Iwata et al. | 508/104 |

FOREIGN PATENT DOCUMENTS

| | | |
|---|---|---|
| DE | 10343618 B3 * | 11/2004 |
| DE | 10 2005 050 374 A1 * | 2/2007 |
| EP | 528453 A1 * | 2/1993 |
| EP | 0947260 A1 | 10/1999 |
| GB | 2252564 A * | 8/1992 |
| WO | 9100375 A1 | 1/1991 |

* cited by examiner

THERMAL SPRAYED BEARING SHELLS FOR CONNECTING ROD

This application claims the priority, under 35 U.S.C. §119, of German Patent Application DE 10 2004 055 228.2 filed on Nov. 17, 2004.

BACKGROUND OF THE INVENTION

1. Field of the Invention

The invention relates to highly wear resistant and durable bearing shells for connecting rods as well as suitable fabrication processes.

The usual procedure for the fabrication of bearing shells of this type is to line a base material (e.g. steel or light metal) with a pre-fabricated bearing shell.

With the development of new generations of motor vehicles the requirements on the materials used in the engine are constantly increasing. The available bearings of the engines, and the connecting rod bearings in particular, are no match for the resulting increasingly high mechanical loads, especially on the long term.

While in the past Pb-containing alloys on Cu-basis have frequently been used as slide bearing material, they are today increasingly replaced by Pb-free alloys for environmental reasons.

For cost considerations it is not desirable to fabricate the bearing shells as individual pieces and to fit them into and connect them with the connecting rod, but rather, it is preferred to directly deposit the bearing shell as a coating onto the surface of the connecting rod eye.

2. Description of Related Art

In DE 197 31 625 processes are disclosed which deposit the bearing layer directly by means of thermal spraying of a bearing material onto the connecting rod eye.

Often the bearing layers feature an additional sliding layer on their surface made from a comparable soft material. This is made using e.g. Pb-alloys or Al/Sn-alloys. As slide bearings for higher technical requirements Al/Cu-alloys are known with Sn-contents in the range of 17 to 35% by weight. WO 9100375 describes a bearing with a contact layer which is made from a base material, in particular Al, and a dispersed phase therein, in particular Sn. The sliding layer is deposited by a sputtering process.

With respect to high mechanical loads which especially result in high temperatures in the sliding zone the known sliding layers do not exhibit the required long term stability and under dry running conditions do not provide the required safety margin regarding galling. Especially with the demanding requirements of modern engines a partial short term outage of the oil cooling on the sliding surface is not a rare operating condition, resulting in very demanding requirements with regard to the dry running ability.

SUMMARY OF THE INVENTION

The objective of the invention is to create a cost efficient bearing shell made from a bearing layer with a surface acting as sliding layer, which fulfills the highest requirements regarding pressure, temperature and long term stability as well as creating a suitable cost efficient fabrication process for it.

DETAILED DESCRIPTION OF THE INVENTION

The objective is accomplished according to the invention by a bearing shell (4) of a connecting rod (1) having a larger connecting rod eye (2) and a smaller connecting rod eye (3), which bearing shell (4) is located in the larger connecting rod eye (2). The bearing shell is constituted by several thermally sprayed layers (4a, 4b) and wherein the topmost material layer (4a) of the bearing shell (4) is essentially constituted by an aluminum/bismuth alloy, as well as a bearing shell of a connecting rod which is located at least in the larger connecting rod eye, and a process for the fabrication of a bearing shell on a connecting rod eye, as well as a process for the fabrication of a bearing shell on a connecting rod eye.

For the bearing shell of a connecting rod according to the invention it is essential, that the topmost material layer of the bearing shell is essentially made from an aluminum/bismuth-alloy.

BRIEF DESCRIPTION OF THE DRAWINGS

In the following the invention will be described in greater detail on the basis of figures wherein.

Figure 1:
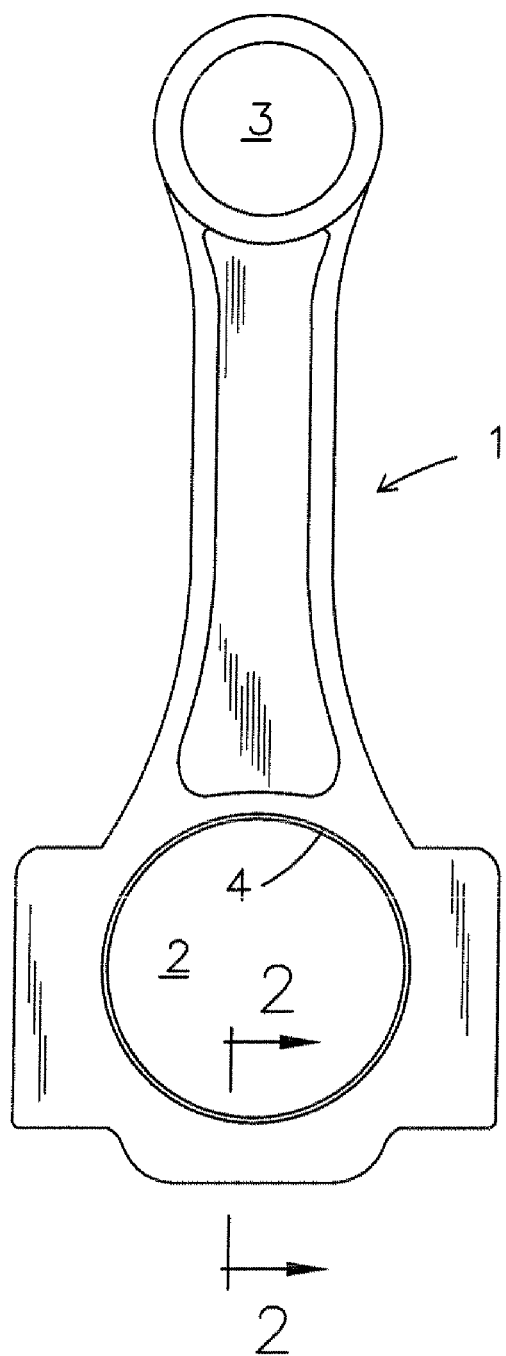
FIG. 1 depicts a connecting rod having a larger and a smaller connecting rod eye, with a bearing shell located in the larger connecting rod eye.
Figure 2:
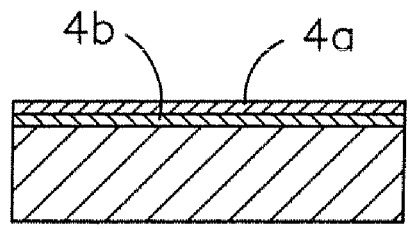
FIG. 2 is an enlargement of section 2-2 of FIG. 1, showing two thermally sprayed layers.

Therein the Al/Bi-alloy features a structure which consists of a metal matrix essentially consisting of Al and a disperse phase essentially consisting of Bi. This most preferable structure according to the invention is mainly caused by the low solubility of Bi and Al.

Through this material combination it is achieved that, because of the low solubility of the Bi in Al, on one hand a very fine distributed disperse phase is constituted and, on the other hand, the thermal stability of the disperse phase, and with that of the entire bearing layer, is significantly increased due to the comparably high melting point of the Bi, respectively of its alloys, with respect to comparable bearing layers. Through the miscibility gap in the system Al/Bi, additionally the tendency of the dispersedly distributed Bi to re-crystallize at elevated temperatures is significantly reduced. Thus, a high long term stability of the respective sliding layer is achieved. The melting point of the Bi at 271° C. is significantly higher than the melting point of the Sn at 232° C. which is utilized as alloy component in comparable plain bearings or sliding layers.

As well known, most bismuth alloys feature a relatively low melting point which is below the melting point of bismuth as well as the other alloy constituents. Therefore bismuth is typically used as alloy constituent to lower the melting point of an alloy. A bismuth alloy from bismuth, lead, indium, tin, and cadmium exhibits a melting point of below 50° C. Other alloys with bismuth are, for instance "woody metal" (bismuth 50%, lead, tin and cadmium) with a melting point of 71° C. or Lichtenberg metal (bismuth each 50% with changing fractions of tin and lead).

In comparison to that, the preferred alloys of the Bi according to the invention feature a much higher melting point. Preferably Bi alloys with a melting point above 250° C. are utilized. This group includes for instance Bi alloys with 3 to 6% by weight of Sn or Sb, e.g. Bi with 4% by weight of Sn (melting point: 316° C.) or Bi with 5% by weight of Sb (melting point: 296° C.).

In a first embodiment of the invention a bearing shell is featured which is located in the larger connecting rod eye of a connecting rod in which the bearing shell consists of several thermally sprayed layers, in which the topmost material layer of the bearing shell is essentially constituted by an aluminum/bismuth alloy.

According to the invention, the layers constituting the bearing shell are thermally sprayed layers. These layers exhibit comparable high densities, low porosities and good strengths. The lamellar structure which typically develops through these processes has proven to be advantageous for the sliding and bearing properties. For the sliding layer consisting of Al/Bi alloy, the formation of the preferred structure of Al matrix with a disperse Bi phase is supported by the deposition of the layers from the melt and the very rapid cool-down rates.

According to the invention, the topmost material layer thereby features an Al/Bi alloy which is exceptionally suitable as a sliding layer. The layer below the sliding layer may consist of the usual bearing materials or alloys; these constitute a bearing layer. This combination of bearing and sliding layer has the advantage that the already good sliding and bearing properties of the bearing layer are significantly improved by the sliding layer according to the invention. In a preferred embodiment the bearing shell is constituted by two layers in which the sliding layer is made from the Al/Bi alloy and the bearing layer from bronze or brass. Because of the good sliding properties of the sliding layer it is possible to choose a comparably hard and wear resistant bearing layer.

To be able to act as a support layer for the sliding layer, the bearing layer needs to have a sufficient strength. This is particularly achieved by providing a suitable layer thickness.

Preferably the bearing layer, especially when made from a bronze or brass layer, has at least 5 times the thickness of the sliding layer made from the Al/Bi alloy. Especially preferred it features 10 fold the thickness. Accordingly the Al/Bi layer features a thickness of preferably between 1 μm and 80 μm. Especially preferred is a thickness in the range between 4 μm and 40 μm. Material thicknesses above these values do not noticeably improve the sliding properties.

Another embodiment according to the invention relates to the bearing shell of a connecting rod which is at least located in the larger connecting rod eye in which the entire bearing shell essentially consists of a thermally sprayed layer of aluminum/bismuth alloy. In contrast to the first embodiment of the invention the Al/Bi layer serves both the function of the sliding as well as the bearing layer. This double function of the Al/Bi alloy layer results in a significant simplification of the overall design of the bearing shell. In particular, the different mechanical properties of the bearing layer and the sliding layer no longer need to be exactly adjusted to each other. Also it is of advantage, that basically any adhesion problems between the bearing and sliding layer are avoided.

The deposited bearing shell from an Al/Bi alloy preferably features a thickness between 0.1 mm and 1 mm, especially preferred between 0.3 mm and 0.5 mm.

For the advantageous properties of the Bi with regard to the sliding properties, it is of importance that the Bi does not exist in atomic solution within the Al but rather as a nano- or micro-disperse phase. For the sliding and/or bearing layer of the Al/Bi alloy according to the invention the bismuth therefore exists preferably for the most part in a disperse phase within the metallic matrix of Al or an Al alloy. Other fractional amounts of the Bi may exist in solution.

The preferred size of the Bi dispersion is achieved when the bismuth is distributed fine enough so that it cannot be detected by the usual X-ray diffraction methods, i.e. it is X-ray amorphous. Also, the bismuth is preferably distributed fine enough so that its primary phases cannot be identified by means of light microscopy.

In the preferred Al/Bi alloy according to the invention the Bi content is in the range of 10 to 40% by weight of the alloy. Especially preferred is when the Bi content is in the range of 15 to 25% by weight. For the sliding layer, a higher Bi content than for the bearing layer is advantageous, it is typically 20 to 40% by weight. In case the bearing shell is constituted by the Al/Bi alloy only, a corresponding variation of the composition, i.e. increase of the Bi content, across the layer thickness can be of advantage.

In another advantageous embodiment of the invention, the deposited bearing shell, respectively the Al/Bi alloy, includes silicon as additional constituent. As a result of the Si the wear and temperature behavior is further improved. Through the deposition process according to the invention the Si is preferably deposited in Si-rich phases or deposits, which significantly enhance the wear resistance. The bearing shell preferably features Si contents between 0.1 and 14% by weight, especially preferred between 0.1 and 10% by weight.

Sn or Sb in particular are of advantage as additional alloy constituents of the Al/Bi alloy, since these elements constitute Bi-alloys with higher melting points. The preferred amount of Sn and/or Sb is in the range of between 3 to 6% by weight of the Bi content.

Another preferred alloy element of the Al/Bi alloy is copper. The preferred amount is in the range of 0.1 to 5% by weight. Since the effect of the Cu is in particular a solidification of the Al matrix, the use of Cu is especially of advantage in case the Al/Bi alloy constitutes both the bearing as well as the sliding layer.

Especially to keep the melting point of the Al/Bi alloy high it is useful to keep the Sn and/or Pb content as low as possible. Preferably the Sn and/or Pb content of the Al/Bi alloy is below 0.5% by weight. Especially preferred is an alloy without any Sn and/or Pb. This means that there are only residues of these elements in the alloy.

Another aspect of the invention relates to a process for the fabrication of a bearing shell on a connecting rod eye with the following steps:

mechanical roughening of the connecting rod surface in the region of the bearing, thermal coating onto the surface with a bearing metal or a bearing material to build up a bearing layer, thermal coating onto the bearing layer with an Al/Bi alloy to build up a sliding layer.

Therein it is useful to add additional steps regarding the cracking and re-joining of the connecting rod bearing. For this it is in principle only important to prevent a spalling of the layer at the edges during the cracking. The pertinent procedures are known to the expert. The connecting rod can for instance be cracked prior to the deposition and is re-joined prior to the deposition. Also it is possible to coat the two half shells individually and re-join them afterwards. It may be of advantage to first deposit the bearing layer, then crack the connecting rod, re-join the connecting rod and then proceed with the sliding layer deposition. In this case the connecting rod not opened until assembly.

In the first step of the process according to the invention the surface of the connecting rod is roughened, for which mechanical roughening is preferred. For this, in particular, sandblasting and especially preferred high pressure water blasting are utilized. Compared to methods based on solid particle blasting like e.g. sand blasting, high pressure water blasting has the significant advantage that it does not leave residues of the blasting material embedded in the surface. These would negatively affect the adhesion of the deposited layers.

In a next step the surface is thermally coated with a bearing metal or a bearing material to build up a bearing layer. The preferred thermal spray process according to the invention results in layers with comparably high densities, low porosities and good strengths. Likewise, these processes feature a high deposition rate and a good adhesion on the substrate material compared to the common alternative methods, in particular PVD, CVD or galvanic processes.

In a subsequent process step a sliding layer of Al/Bi alloy is deposited. The process according to the invention is, again, thermal spraying. The rapid cool down rates of the Al/Bi melts during the thermal deposition promote the development of the preferred structure of an Al matrix with a disperse phase.

Among the preferred bearing materials for the thermal spraying are bronze and brass. Furthermore Al-bronze is especially suitable.

In a preferred embodiment of the process according to the invention, the bearing surface is treated with an adhesion promoting layer prior to the thermal coating with an Al/Bi alloy. Here particularly Ni containing layers have proven to be of advantage.

A further embodiment according to the invention features the following essential process steps for the fabrication of a bearing shell on a connecting rod eye:
 mechanical roughening of the connecting rod surface in the region of the bearing,
 thermal coating onto the surface with an Al/Bi alloy to build up a bearing and sliding layer.

In this variant of the process according to the invention the Al/Bi layer serves as bearing layer and sliding layer in one entity. In this embodiment it is crucial to utilize a thermal spraying process.

Among the suitable thermal spray processes according to the invention are plasma spraying, flame spraying (FLSP), high speed flame spraying, plasma arc spraying (PSP), electric arc spraying (EASP) and hybrid electric arc spraying (hybrid-EASP).

For the hybrid-EASP process at least one oxygen containing vaporizer gas and a burnable gas are fed into the spray gun. The burnable gas is ignited in a combustion chamber in the direct vicinity or behind the electric arc and develops a flame jet after leaving the nozzle. Through the additional combustion the deposition energy of the sprayed particulates is enhanced.

These processes are particularly suitable since high deposition rates are achieved at low layer porosities. Especially for the deposited Al/Bi alloy it is of advantage that the spray material is only molten and not, or just to a negligible extent, evaporated. It is deposited in the form of very fine droplets. Through this the formation of a structure of an Al matrix and a very fine distributed disperse phase of Bi or Bi alloy is promoted. In contrast to this, depositions by e.g. PVD or CVD processes occur almost on the atomic level which promotes atomic intermixing in the deposited layer. The Al/Bi alloys are monotectic alloys which belong to the class of non-miscible alloys. This means that in the molten liquid state a region of compositions exists in which the constituents can not mix (miscibility gap). In case the bearing layer according to the invention is constituted, or, as the case may be, deposited, at elevated temperatures and rapidly cooled down, then a very fine structure develops with a defined disperse phase of Bi respectively Bi alloy.

Amongst the especially preferred deposition processes are the electric arc spraying (EASP) and the hybrid electric arc spraying (hybrid-EASP).

With these processes the spray material can be easily and cost efficiently provided by means of the flux core technique. With this technique very homogeneous layers can be fabricated. In a preferred embodiment at least one of the wires is a flux core wire with an aluminum jacket and a bismuth core. Also, wires with different compositions may be utilized. Thereby a Bi containing flux core wire may well be combined with an Al wire.

In another embodiment of the invention the surface of the bearing shell features recesses, grooves or little cup-like indentations which act as lubricant reservoirs to help prevent dry running conditions.

Preferably the surface of the bearing shell is smoothened after the deposition of the sliding layer and subsequently the recesses are fabricated. The smoothening may be done by honing.

The recesses, grooves or cup like indentations are preferably fabricated by a galvanic process.

We claim:

1. A bearing shell of a connecting rod having a larger and a smaller connecting rod eye, which bearing shell is located in the larger connecting rod eye, wherein the bearing shell is constituted by several thermally sprayed layers, wherein the topmost material layer of the bearing shell is essentially constituted by an aluminum/bismuth alloy, wherein the bismuth exists substantially as nano- or micro-disperse phase wherein the bismuth is distributed so finely that it is (a) x-ray amorphous and (b) its primary phases can not be detected by means of light microscopy.

2. A bearing shell according to claim 1, wherein the bearing shell features at least two layers in which a bearing alloy layer made from bronze or brass is located below the Al/Bi alloy.

3. A bearing shell according to claim 1, wherein the alloy layer is at least 5 times the thickness of the Al/Bi layer.

4. A bearing shell according to claim 1, wherein the Al/Bi layer has a thickness between 4 μm and 80 μm.

5. A bearing shell according to claim 1, wherein the bismuth exists predominantly in a disperse phase within a metallic matrix of Al or Al alloy.

6. A bearing shell according to claim 1, wherein the bearing shell additionally contains Si between 0.1 and 10% by weight.

7. A bearing shell according to claim 1, wherein as additional alloy components the Al/Bi alloy contains Sn or Sb in a quantity of 3 to 6% by weight of the Bi content.

8. A bearing shell according to claim 1, wherein the Al/Bi alloy contains copper in a quantity between 0.1 and 5% by weight.

9. A bearing shell according to claim 1, wherein the Sn content of the Al/Bi alloy is below 0.5% by weight.

10. A bearing shell according to claim 1, wherein the Pb content of the Al alloy is below 0.5% by weight.

11. The bearing shell according to claim 1, wherein the topmost material layer of the bearing shell is formed by a deposition processes selected from plasma spraying, flame spraying (FLSP), high speed flame spraying, plasma arc spraying (PSP), electric arc spraying (EASP) and hybrid electric arc spraying (hybrid-EASP).

12. The bearing shell according to claim 11, wherein the deposition processes is selected from electric arc spraying (EASP) and hybrid electric arc spraying (hybrid-EASP).

13. A bearing shell of a connecting rod having a larger and a smaller connecting rod eye, which bearing shell is at least located in the larger connecting rod eye, wherein the entire bearing shell is essentially constituted by a thermally sprayed layer of aluminum/bismuth alloy, wherein the bearing shell has a thickness between 0.1 mm and 1 mm, and wherein the bismuth exists substantially as nano- or micro-disperse phase wherein the bismuth is distributed so finely that it is (a) x-ray amorphous and (b) its primary phases can not be detected by means of light microscopy.

14. A bearing shell of a connecting rod having a larger and a smaller connecting rod eye, which bearing shell is located in the larger connecting rod eye, wherein the bearing shell is constituted by several thermally sprayed layers, wherein the topmost material layer of the bearing shell is essentially constituted by an aluminum/bismuth alloy, wherein the bismuth exists substantially as nano- or micro-disperse phase wherein the bismuth is distributed so finely that it is (a) x-ray amorphous and (b) its primary phases can not be detected by means of light microscopy, and wherein the bismuth content in the Al/Bi alloy is between 10 and 40% by weight.

15. The bearing shell according to claim 14, wherein the bismuth content in the Al/Bi alloy is between 20 and 40% by weight.

* * * * *